United States Patent
Van Der Poel

(10) Patent No.: US 10,412,932 B2
(45) Date of Patent: Sep. 17, 2019

(54) BRUSH FOR LIVESTOCK ANIMALS, DEVICE COMPRISING A BRUSH OF THIS TYPE, AND METHOD FOR BRUSHING LIVESTOCK ANIMALS

(71) Applicant: DELAVAL HOLDING AB, Tumba (SE)

(72) Inventor: Hans Van Der Poel, Roelofarendsveen (NL)

(73) Assignee: DELAVAL HOLDING AB, Tumba (SE)

( * ) Notice: Subject to any disclaimer, the term of this patent is extended or adjusted under 35 U.S.C. 154(b) by 329 days.

(21) Appl. No.: 14/615,650

(22) Filed: Feb. 6, 2015

(65) Prior Publication Data

US 2015/0150217 A1 Jun. 4, 2015

Related U.S. Application Data

(60) Continuation of application No. 14/056,216, filed on Oct. 17, 2013, now Pat. No. 10,271,517, which is a (Continued)

(30) Foreign Application Priority Data

Mar. 4, 2008 (NL) ...................... 2001348

(51) Int. Cl.
*A01K 13/00* (2006.01)
(52) U.S. Cl.
CPC ............ *A01K 13/002* (2013.01); *A01K 13/00* (2013.01); *A01K 13/004* (2013.01)

(58) Field of Classification Search
CPC ..... A01K 13/004; A01K 13/002; A01K 13/00
See application file for complete search history.

(56) References Cited

U.S. PATENT DOCUMENTS

| 431,497 A | 7/1890 | Walker |
| 911,702 A * | 2/1909 | Carroll ................. A46B 13/001 |
| | | 15/179 |

(Continued)

FOREIGN PATENT DOCUMENTS

| CN | 1356878 | 7/2002 |
| CN | 200956754 | 10/2007 |

(Continued)

*Primary Examiner* — Thanh Pham
(74) *Attorney, Agent, or Firm* — Young & Thompson

(57) ABSTRACT

A rotatable livestock brush has a rotation axis and a brush surface configured to be brought into contact with a contact region of a body of a livestock animal. The brush surface includes at least a first region having first pressure-transfer properties, and a second region having second pressure-transfer properties which differ from the first pressure-transfer properties. A plane at a right angle to the rotation axis intersects both the first and second regions. The brush has a cylinder shape with a central cylinder axis. The rotation axis is eccentric and in a position which differs from a position of the central cylinder axis. Upon rotation, the brush massages the body of the livestock animal in the contact region thereof by transferring the varying pressures onto the body of the animal by successively bringing the first and second brush surface regions into contact with the body of the animal.

15 Claims, 3 Drawing Sheets

Figure 1:
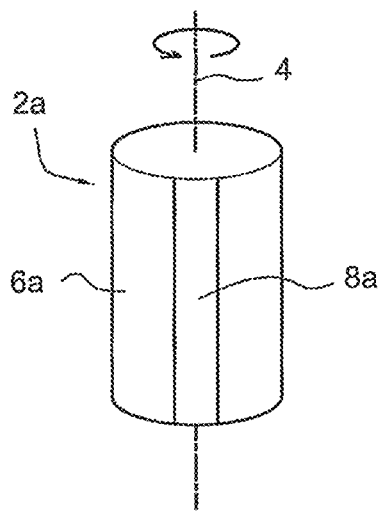

Related U.S. Application Data division of application No. 12/920,344, filed as application No. PCT/SE2009/000117 on Mar. 3, 2009, now abandoned.

(56) References Cited

U.S. PATENT DOCUMENTS

| | | |
|---|---|---|
| 1,142,698 A | 6/1915 | Grove et al. |
| 2,507,373 A | 5/1950 | Finkelstein |
| 3,176,658 A | 4/1965 | Keene |
| 5,301,695 A | 4/1994 | Wong |
| 5,337,765 A | 8/1994 | Wong |
| 6,098,635 A | 8/2000 | Marino |
| 6,155,204 A | 12/2000 | van der Lely et al. |
| 6,343,566 B1 | 2/2002 | Eriksson |
| 7,481,184 B2 | 1/2009 | van der Poel |
| 7,650,893 B2 | 1/2010 | De Laforcade |
| 7,845,047 B2 | 12/2010 | Loftis |
| 2002/0078902 A1* | 6/2002 | Ehrmann ............ A01K 13/002 119/625 |
| 2005/0161003 A1 | 7/2005 | van der Poel |
| 2006/0026783 A1* | 2/2006 | McKay ............ A01K 13/002 15/104.94 |
| 2007/0000045 A1 | 1/2007 | Underhill |
| 2007/0169720 A1 | 7/2007 | Roy |
| 2007/0295281 A1* | 12/2007 | Fortson ............ A01K 13/001 119/601 |
| 2008/0245383 A1 | 10/2008 | Tomandl |
| 2010/0024139 A1* | 2/2010 | Linsbichler ............ A47L 11/06 15/31 |

FOREIGN PATENT DOCUMENTS

| | | |
|---|---|---|
| DE | 4130634 | 11/1992 |
| DE | 197 34 289 | 11/1998 |
| DE | 200 14 581 | 1/2001 |
| DE | 10213442 | 12/2003 |
| EP | 1181862 | 2/2002 |
| EP | 1184862 | 3/2002 |
| EP | 1428456 | 6/2004 |
| JP | 09065790 | 3/1997 |
| NL | 1020252 | 9/2003 |
| NL | 1022949 | 9/2004 |
| RU | 2 055 468 | 3/1996 |
| RU | 27776 | 5/2004 |
| RU | 37591 | 5/2004 |
| RU | 49 679 | 12/2005 |

* cited by examiner

BRUSH FOR LIVESTOCK ANIMALS, DEVICE COMPRISING A BRUSH OF THIS TYPE, AND METHOD FOR BRUSHING LIVESTOCK ANIMALS

The present invention relates to a brush for livestock animals. The invention also relates to a device comprising a brush of this type. Furthermore, the invention relates to a method for brushing livestock animals. In this case, the term livestock animals is understood to include in particular large animals, such as cows, horses, deer, buffalo, pigs, goats and the like, but the application of the brush, the device and the method is not limited to these animals.

A brush device for brushing livestock animals is known from the prior art and disclosed in NL 1020252. An elongate, substantially cylindrical brush is set in motion by a drive means, in particular made to rotate about a rotation axis thereof. The brush is supported in a flexible manner, so that it can have various orientations during operation, such as a vertical orientation (that is to say, an orientation in which the rotation axis extends vertically), a horizontal orientation (that is to say, an orientation in which the rotation axis extends horizontally), as well as intermediate orientations or close orientations, such as arbitrary orientations in arbitrary imaginary vertical planes which have arbitrary horizontal orientations.

Furthermore, brushes are known from the prior art in which the rotation axis extends substantially horizontally, and the height of which can be varied. Brush configurations comprising an assembly of brushes, of which a first brush has a rotation axis which is directed substantially horizontally, and a second brush has a rotation axis which is directed substantially vertically are also known.

Brushing livestock animals is, a pleasant experience by the livestock animals, and in addition has proven to have positive effects which improve the health and well-being of the livestock animals. Brushing increases the blood circulation in the skin and thereby increases the vitality of the skin. The brushing removes dust and dirt from the coat or fur of the livestock animals, as well as excessive hair. There are thus fewer opportunities for any harmful organisms to settle on and in the skin, and in the fur, which benefits the general health of the livestock animals. In addition, the brush, by means of its bristles, offers the possibility of transferring skin- and fur-treatment agents or other agents, for example for combating diseases, onto the skin and the fur of the livestock animals. In the case of milk-producing livestock animals, it has been found that brushing leads to an increase in the production of milk.

It is an object of the invention to improve the brush for use in a brush device in such a manner that the well-being of the livestock animals which come into contact with the brush increases. In addition, the quality of the products from the livestock animals, such as meat, hide and/or hair, may improve.

According to the present invention, at least the first-mentioned object is achieved by the measures of each of the independent claims. Particular embodiments are described in the dependent claims.

In a first aspect, the invention provides a brush. By providing the brush, which has a rotation axis and a brush surface which is intended to be brought into contact with the body of the livestock animal in a contact region for transferring a pressure onto the body of the livestock animal, with a brush surface which comprises a first region having first pressure-transfer properties, and a second region having second pressure-transfer properties which differ from the first pressure-transfer properties, and in which a plane at right angles to the rotation axis intersects both a first region and a second region, the brush, upon rotation around the rotation axis, not only performs a brushing treatment, but simultaneously a massage treatment on the body of the livestock animal in the contact region thereof. The pressure which the brush surface transfers to the body of the livestock animal during the rotation of the brush is variable due to the fact that a first and a second region alternately pass the contact region of the livestock animal, which constitutes the massage treatment. The varying pressure which is thus produced in the contact region results in the skin and the tissue below the latter being alternately compressed and relaxed, with the skin and the tissue below the latter being stimulated and any stress which may be present being reduced. By selecting a suitable direction of rotation, speed and any variation therein for the brush, a desired rhythm and intensity of the massage can be set.

In addition to a first and second region, the brush according to the invention may comprise further regions having pressure-transfer properties which may both differ from one another and be different from those of the first and second region.

In an embodiment, the brush essentially has the shape of a cylinder with a central cylinder axis. The diameter of the brush may in this case, viewed along a line from a point on the edge of a cylinder end and parallel to the rotation axis to a point on the edge of the opposite cylinder end, be constant, but may also increase, decrease or (if desired, repeatedly) increase and subsequently decrease again, or (if desired, repeatedly) decrease and subsequently increase again, for example in order to form a frustoconical profile, a convex or concave profile or an undulated profile along said line. In this publication, such shapes are deemed to be included under the term cylindrical.

In an embodiment, the rotation axis of the brush, which essentially has the shape of a cylinder, coincides with the central cylinder axis.

In another embodiment, the rotation axis of the brush, which essentially has the shape of a cylinder, is in a position which varies from that of the central cylinder axis. In this case, the rotation axis of the brush may or may not be parallel with the central cylinder axis. In both cases, the distance between the brush surface and the rotation axis will vary, viewed over one rotation of the brush, upon rotation of the brush.

In an embodiment, the first region is at a first distance from the rotation axis, and the second region is at a second distance from the rotation axis, with the second distance differing from the first distance. Such an embodiment is for example achieved by a substantially cylindrical brush, the central cylinder axis of which does not coincide with the rotation axis, but may also be achieved by a substantially cylindrical brush in which the central cylinder axis coincides with the rotation axis, and the brush surface essentially, but not completely, follows a true cylindrical surface. Of course, in the embodiment where the first region is at a first distance from the rotation axis, and the second region is at a second distance from the rotation axis, with the second distance being greater than the first distance, the brush does not have to be cylindrical, but can also have any other suitable shape. As a result of the difference between the first distance and the second distance, a varying pressure is exerted on the contact surface of the body of the livestock animal in the course of a rotation of the brush. If, for example, the spatial location of the contact surface hardly changes during a rotation of the brush (the livestock animal does not move), and the location of the rotation axis of the brush in space also hardly changes during a rotation of the brush, the material of the brush in regions between the rotation axis and the contact surface with a relatively great distance between the brush surface and the rotation axis will be deformed to a greater degree (and thus produce a greater pressure transfer via the brush surface) than the material of the brush in regions between the rotation axis and the contact surface with a relatively small distance between the brush surface and the rotation axis (which is deformed to a lesser degree or not at all and thus produces a smaller pressure transfer or no pressure transfer via the brush surface), resulting in a massaging action of the brush. As another example, if the spatial location of the contact surface during a rotation of the brush hardly changes (the livestock animal does not move), but the spatial location of the rotation axis of the brush can change during a rotation of the brush as a result of a free suspension of the brush, then the mass and the speed of the brush material result in a varying pressure transfer from the brush surface to the contact surface.

If the first region is at a first distance from the rotation axis, and the second region is at a second distance from the rotation axis, with the second distance differing from the first distance, the first region and the second region of the brush surface may be made from the same material, be of identical design and have the same deformability and elasticity, but the first and second region may also be made from different materials and/or be of different design and/or have a different deformability and elasticity.

In an embodiment, the second region extends substantially at an angle of less than 90 degrees relative to the rotation axis of the brush. In this case, the second region has a width and length, the width being fixed or variable and on average smaller than the length. If the brush is a substantially cylindrical brush, the second region may extend from one end of the cylinder to the opposite end. Such a second region may also be interrupted by a part of the first region, or a third or another region. The distance between the brush surface and the rotation axis in the first region may differ from that in the second region and may, in particular, be smaller than that in the second region. The first and second regions may then comprise the same materials, and be of identical design with identical deformability and elasticity, but may also comprise different materials, and be of different design with different deformability and elasticity. In particular, the material which forms the second region may be less deformable and/or elastic than the material of the first region when the same force is applied.

In an embodiment, the second region is at least partially helical and extends at, for example, an angle of between 25 and 65 degrees, preferably at an angle of 45 degrees, relative to the rotation axis. The pitch of the helix may be fixed or variable, viewed along the length of the second region. In the case of a substantially cylindrical brush, the helical second region may extend from one end of the cylinder to the opposite end. A helical second region may be interrupted by a part of the first region, or by a third or another region. A brush may comprise a number of helical second regions which have been twisted together using essentially the same pitch and are, for example, evenly distributed across the brush surface. A brush may also comprise a number of helical second regions having opposite pitches. The distance between the brush surface and the rotation axis in the first region may differ from that in the second region and, in particular, may be smaller than that in the second region. The first and second regions may then comprise the same materials, and be of identical design and have identical deformability and elasticity, but may also comprise different materials, and be of different design with different deformability and elasticity. In particular, the material which forms the second region may be less deformable and/or elastic than the material forming the first region when the same force is applied.

In an embodiment, the second region extends substantially parallel to the rotation axis of the brush. If the brush is substantially cylindrical, the second region may extend from one end of the cylinder to the opposite end. A second region may be interrupted by a part of the first region, or a third or another region. A brush may comprise a number of parallel second regions which are, for example, evenly distributed across the brush surface. The distance between the brush surface and the rotation axis in the first region may differ from that in the second region and may, in particular, be smaller than that in the second region. The first and second regions may then comprise the same materials, and be of identical design and have identical deformability and elasticity, but may also comprise different materials, and be of different design and have different deformability and elasticity. In particular, the material which forms the second region may be less deformable and/or elastic than the material forming the first region when the same force is applied.

In one embodiment, the first region is formed by at least one deformable, resilient element having a first resistance to deformation, the second region being formed by at least one deformable, resilient element having a second resistance to deformation, the first resistance differing from the second resistance. The deformable, resilient element may be a hollow, flexible body which is filled with a gas under superatmospheric pressure, for example a spherical or tubular element.

In an embodiment, the first region is formed by free ends of first elongate, deformable and resilient brush elements and the second region is formed by free ends of second elongate, deformable and resilient brush elements, the second brush elements having a stiffness which differs from the stiffness of the first brush elements.

In a second aspect, the invention provides a brush device, which comprises at least one brush according to the invention, a drive device for rotating the brush about its rotation axis; and a support device for supporting the brush and the drive device, which support device is to be attached to a supporting surface. The brush device may be, for example, a brush device known from the prior art which is provided with the brush according to the invention.

In an embodiment of the brush device, the brush is supported by the support device in such a manner that the orientation of the rotation axis can at least vary in a range between a vertical and a horizontal orientation.

In a third aspect, the invention provides a method for brushing livestock animals, comprising bringing a brush surface of a brush into contact with the bodies of the livestock animals in a contact region for transferring a pressure onto the bodies of the livestock animals, in which, successively, a first region of the brush surface having first pressure-transfer properties, and a second region of the brush surface having second pressure-transfer properties which differ from the first pressure-transfer properties, are brought into contact with the bodies of the livestock animals in order to massage, by means of the brush, the bodies of the livestock animals at the contact region thereof.

In an embodiment of the method, the brush is a rotating brush with a rotation axis, in which a plane at right angles to the rotation axis of the brush intersects both the first region and the second region.

It should be noted that the term "brush" in this description is understood to mean a device which, at least partially, comprises brush elements, that is to say elongate, flexible elements with a length/thickness ratio of >>1, in which free ends of the bristles are situated on the brush surface, that is to say in this case the surface which has a brushing action, at least at the location of the free ends of the bristles. It is also possible for other elements to be present on the "brush surface" which cannot be defined as brush elements or ends thereof, in particular in a second region of the brush surface, but not limited thereto.

Figure 9:
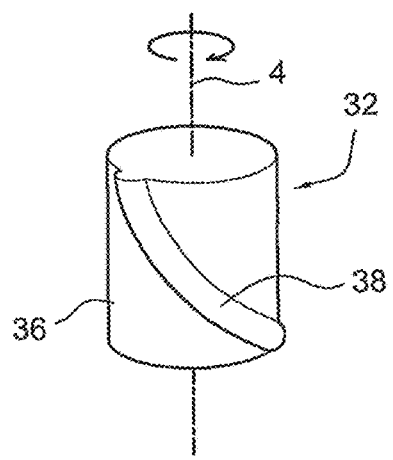
Figure 10:
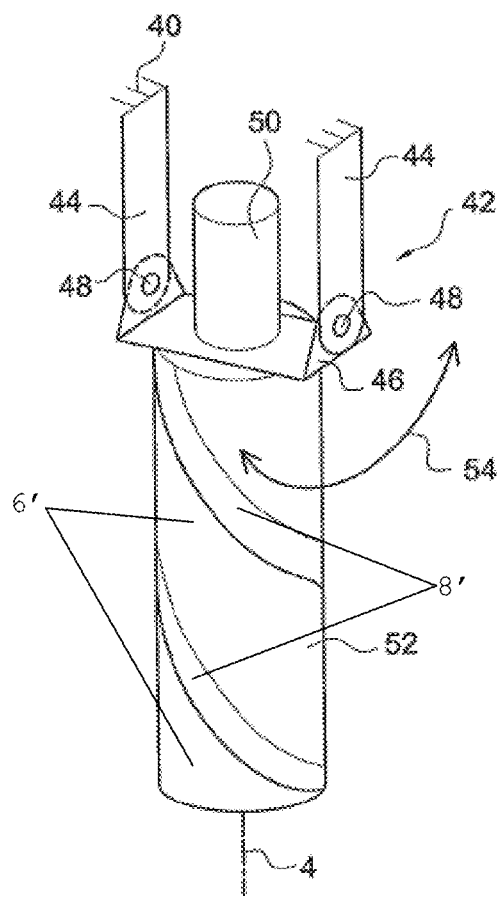

The invention will be explained in more detail below with reference to figures which show non-limiting exemplary embodiments of brushes according to the invention, as well as a device of which such a brush forms part, in which:

FIGS. 1-9 diagrammatically show perspective views of embodiments of brushes according to the invention; and FIG. 10 diagrammatically shows a perspective view of an embodiment of a brush device according to the invention.

In the various figures, identical parts or parts which perform a similar function are indicated by the same reference numerals.

FIG. 1 shows a substantially cylindrical elongate brush 2a which can be driven by a drive mechanism (not shown in detail) for rotation about a central cylinder axis 4, also referred to as rotation axis 4. The rotation axis 4 may be in the form of a rod or cylinder to which elements which form the brush surface of the brush are attached. In FIG. 1, the rotation axis 4 coincides with the central axis (of symmetry) of the cylinder shape. The brush surface, which, in the embodiment illustrated in FIG. 1, comprises the curved surface of the cylinder shape, comprises at least one first region 6a having first pressure-transfer properties, and at least one second region 8a having second pressure-transfer properties. Each second region 8a extends substantially in the axial direction in order to form an elongate region which extends substantially parallel to the rotation axis 4.

Figure 2:
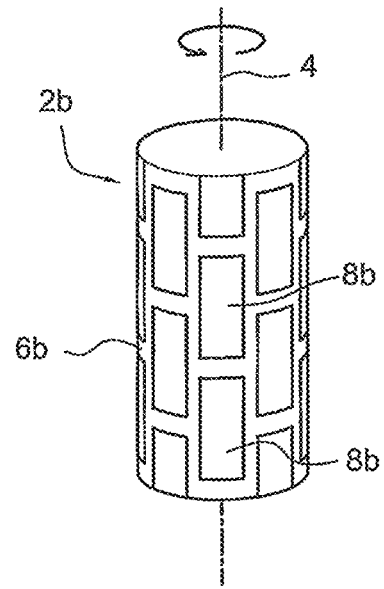

FIG. 2 shows a substantially cylindrical elongate brush 2b which can be driven by a drive mechanism (not shown in detail) for rotation about the rotation axis 4. In FIG. 2, the rotation axis 4 coincides with the central axis (of symmetry) or cylinder axis of the cylinder shape. The brush surface, which, in the embodiment shown in FIG. 2, comprises the curved surface of the cylinder shape, comprises a first region 6b having first pressure-transfer properties, and a number of second regions 8b having second pressure-transfer properties. The second regions 8b extend substantially in the axial direction in order to form elongate regions which extend substantially parallel to the rotation axis 4. The first region 6b is formed by that brush surface which is not a second region 8b. The axial and tangential dimensions of the second regions 8b, their position on the brush surface, and their number can be chosen as circumstances require or on account of proven massage effectiveness. The dimensions of the second regions 8b may differ from one another.

Figure 3:
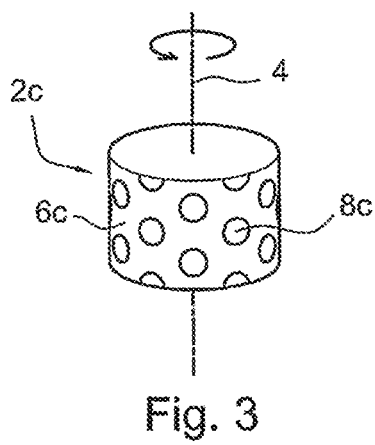

FIG. 3 shows a substantially cylindrical elongate brush 2c which can be driven by a drive mechanism (not shown in any more detail) for rotation about a rotation axis 4. In FIG. 3, the rotation axis 4 coincides with the central axis (of symmetry) of the cylinder shape. The brush surface, which, in the embodiment shown in FIG. 3, comprises the curved surface of the cylinder shape, comprises a first region 6c having first pressure-transfer properties, and a number of second regions 8c having second pressure-transfer properties. The second regions 8c are substantially disc-shaped, and can also be oval, elliptical or have a shape which varies from this, possibly a jagged shape. The first region 6c is formed by that brush surface which is not a second region 8c. The dimensions of the second regions 8c, their position on the brush surface, and their number can be chosen as circumstances require or on account of proven massage effectiveness. The dimensions of the second regions 8c may differ from one another.

Figure 4:
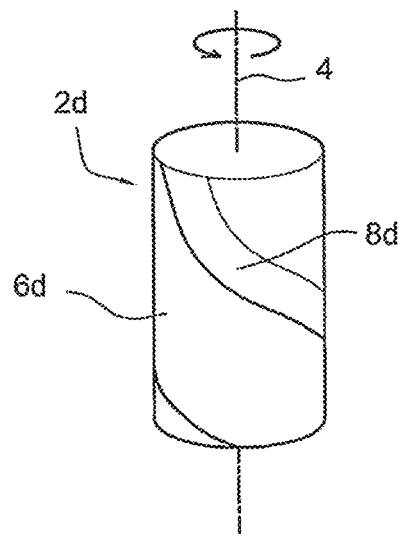

FIG. 4 shows a substantially cylindrical elongate brush 2d which can be driven by a drive mechanism (not shown in any more detail) for rotation about a rotation axis 4. In FIG. 4, the rotation axis 4 coincides with the central axis (of symmetry) of the cylinder shape. The brush surface, which, in the embodiment shown in FIG. 4, comprises the curved surface of the cylinder shape, comprises a first region 6d having first pressure-transfer properties, and at least one second region 8d having second pressure-transfer properties. Each second region 8d extends substantially along a helical line in order to form an elongate region which substantially extends at an angle smaller than 90 degrees, in particular 25-65 degrees, more particularly approximately 45 degrees, relative to the rotation axis 4. The brush 2d may comprise more than one helical second region 8d, the second regions 8d in that case (viewed on the brush surface) optionally being parallel to one another. The pitch of each helical second region 8d may be fixed or variable, viewed along the length of the second region 8d. The pitches of two different second regions 6d may be opposed to one another.

When using the brushes 2a, 2b, 2c or 2d, in which case a part of the brush surface is brought into contact with an animal in a contact region thereof, a varying pressure is exerted on the body of the animal as a result of a rotation of the brush 2a, 2b, 2c or 2d in the contact region by way of massage, as the first region and the second region alternately pass the contact region. As a result of the design of a first and second regions in FIGS. 1-3, the animal will have the sensation that the first and second regions in the contact region are moving substantially in a direction at right angles to the rotation axis 4.

When looking at FIG. 4, the animal will, as a result of the design of the second region 8d, have the sensation that the second region 8d is moving in a direction substantially parallel to the rotation axis 4 in the contact region. In an embodiment of a brush device connected to the brush 2d, the direction of rotation of the brush 2d is adapted to the pitch of the helical second region 8d for creating a predetermined displacement direction of the second region 8d in the contact region which is experienced by the animal. For the circulation of the animal, it is for example advantageous that the direction of the massage which is caused by the brush in the contact region with the animal is directed upwards.

Figure 5:
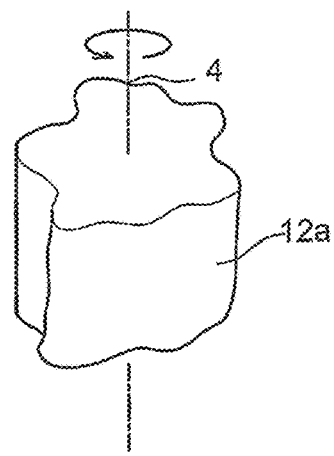

As FIG. 5 illustrates, the diameter of a brush 12a (that is to say the distance between a point on the rotation axis 4 and a point of the brush surface which is situated in the same plane at right angles to the rotation axis in the tangential direction) may vary. This variation in diameter results in a massage effect when the brush 12a touches a contact surface of the livestock animal during its rotation about the rotation axis 4, since various regions of the brush surface having different pressure-transfer properties successively come into contact with the livestock animal in a contact surface thereof.

Figure 6:
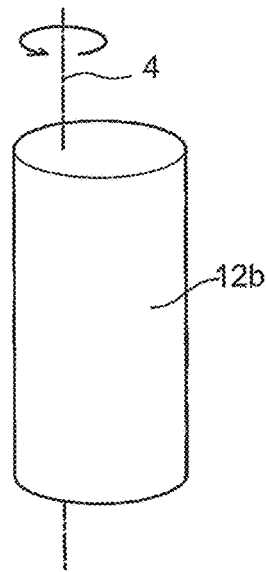
Figure 7:
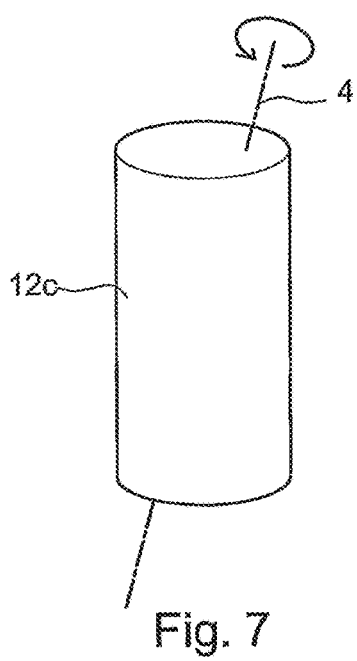

Similar to the embodiment of the brush 12a which is illustrated in FIG. 5, the embodiments of brushes 12b and 12c which are illustrated in the respective FIGS. 6 and 7 have a massaging effect when rotated, due to the fact they these have first regions which are at a first distance from the rotation axis, and second regions which are at a second distance from the rotation axis, with the second distance being different from the first distance.

Figure 8:
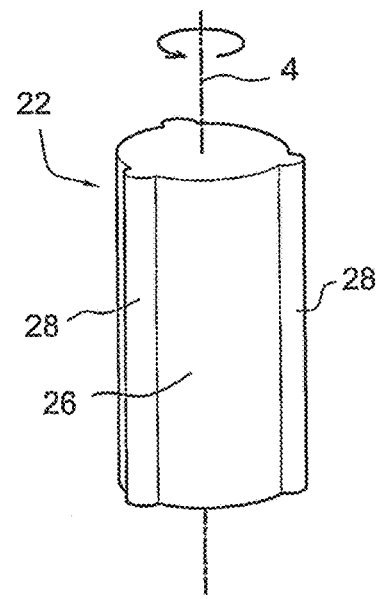

FIG. 8 shows an embodiment of a brush 22 having a number of first regions 26 and a number of second regions 28. The distance of the first regions 26 from the rotation axis 4 is smaller than the distance of the second regions 28 from the rotation axis 4.

FIG. 9 shows an embodiment of a brush 32 having a first region 36 and a second region 38. The distance of the first region 36 from the rotation axis 4 is smaller than the distance of the second region 38 from the rotation axis 4.

In FIGS. 1-9, each first region or each second region or a part thereof, or both each first region and each second region or parts thereof, may be formed by free ends of elongate, flexible and resilient brush elements. If brush elements are used both for the first regions and for the second regions in FIGS. 1-4, the brush elements of the first regions differ in terms of stiffness from the brush elements of the second regions, for example because they differ from one another in terms of material or cross-sectional dimensions. This may also apply to the embodiments of the brushes from FIGS. 5-9.

FIG. 10 diagrammatically shows an embodiment of a brush device, in which the brush according to the invention may be used. A support device 42, which can be fitted, for example, to a ceiling 40 of a housing unit, comprises two supports 44 between which a supporting part 46 which is U-shaped in cross section is mounted so as to be freely rotatable in hinges 48. A motor 50 is attached to the supporting part 46. An output shaft of the motor 50 is connected to a brush 52 including a first region 6' and a second region 8' according to the invention in order to make the brush 52 rotate. Thus, the brush 52 is suspended above a floor of a housing unit which is accessible to livestock animals with its rotation axis directed substantially vertically. The livestock animals can push against the brush 52, with the supporting part 46 being able to hinge in one of the directions indicated by arrow 54, and the orientation of the brush 52 changing (that is to say 25 the direction in which the rotation axis thereof extends). The brush 52 can thus reach both vertical surfaces of the livestock animals and horizontal surfaces of the livestock animals and subject them to the massaging action of the brush.

At least part of the brush surface of the brushes which have been illustrated in the Figures described above is formed by free ends of elongate, flexible and resilient brush elements which extend substantially in the radial direction relative to the rotation axis of the brush. The part of the brush surface formed by the free ends of the brush elements may comprise one or more first regions and/or one or more second regions.

The brush is driven by means of a motor which may be of an electric, hydraulic or pneumatic type. The drive mechanism may be designed to rotate the brush in one direction of rotation or in two opposite directions of rotation. When the drive mechanism is actuated, it may operate intermittently or continuously. The angular speed of the rotation may be fixed or variable. The direction, speed and time period of the rotation and any variations therein during operation of the drive mechanism can be predetermined or can, by means of a suitable control circuit of the drive mechanism, be made dependent on external circumstances, such as the kind of livestock animals to be brushed, the time of day, the amount of ambient light, the load of the drive mechanism and other circumstances. The drive mechanism can be controlled by means of manual or automatic adjustment (for example by use of suitable sensors which are coupled to the control circuit of the drive mechanism) or a combination of a manual and an automatic adjustment. It is also possible to control the drive mechanism remotely. The drive mechanism can be switched on or off manually by a farmer or may be effected by the livestock animals themselves by moving close to or by moving away from the brush (in which case use is made of a motion or presence sensor to activate or deactivate the drive mechanism, respectively), or by pushing against the brush in order to move it out of an inoperative position or to return it to the inoperative position, respectively (in which case the displacement of the brush is detected by a displacement sensor, and this detection is used by the control circuit to control the drive mechanism), or in any other suitable way.

The brush device may, for example, be suspended from or near a ceiling of a housing unit or otherwise above a space where the livestock animals are kept at a location which is readily accessible to the livestock animals. Alternatively, a wall mounting or floor mounting or, for example, a movable frame may be used if necessary.

The brush can also be accommodated in a brush device in such a manner that the position and the orientation of the brush are fixed. Alternatively, the brush can also be arranged in such a manner that the position and/or orientation thereof can vary. Such a variation may be determined beforehand by the design of the brush device where external influences are not an issue, but may also, on the contrary, be brought about by external influences, in particular the force which the livestock animals exert on the brush. In the prior art, various embodiments have been described which offer the above-mentioned possibilities.

It should be understood that the embodiments described are only examples of the invention which may be embodied in various embodiments. Therefore specific structural and functional details which are disclosed herein should not be regarded as being limiting, but only as a basis for the claims and as a representative base to provide sufficient information for those skilled in the art to be able to implement the invention. The terms and phrases which have been used herein are not intended to limit the invention, but rather to give a clear description of the invention.

The term "a(n)", as used in this description, is defined as one or more than one. The expression "a number of", as used in this description, is defined as two or more than two. The expression "another", as used in this description, is defined as at least a second or more. The term "comprising" and/or "with" and/or "having", as used in this description, does not exclude other components which are not mentioned (that is to say, is not limiting). The term "coupled", as used in this description, is defined as connected, not necessarily directly and not necessarily mechanically.

The invention claimed is:

1. A rotatable livestock brush system, comprising:
   a support device that fits to a surface of a livestock housing structure or a support structure within a livestock area, the support device including a motor; and
   a rotatable cylindrical livestock brush attached to the support device and connected to the motor,
   the brush comprising a central rotation axis and a brush surface including a first flexible region and a second flexible region, the first flexible region and the second flexible region having different first and second pressure transfer properties,
   the brush being rotatable about the central rotation axis by operation of the motor to cause the first flexible region and the second flexible region of the brush to respectively alternately transfer varying pressures, corresponding to the first and second pressure transfer properties, onto a body of a livestock animal by alternately bringing the first flexible region and the second flexible region into contact with the body of the livestock animal to massage the livestock animal with both the first flexible region and the second flexible region, wherein each of the first flexible region and the second flexible region comprises a plurality of adjacent flexible bristles, and the second flexible region is helical and extends around an entire circumference of the brush.

2. The rotatable livestock brush system according to claim 1, wherein the brush is sized to massage a body of the livestock animal when the livestock animal is a cow that comes into contact with the brush.

3. The rotatable livestock brush system according to claim 1, wherein the brush is sized to massage a body of the livestock animal when the livestock animal is a goat that comes into contact with the brush.

4. The rotatable livestock brush system according to claim 1, wherein an orientation of the central rotation axis of the brush is variable.

5. The rotatable livestock brush system according to claim 1, wherein the first flexible region and the second flexible region are at a same distance from the central rotation axis.

6. The rotatable livestock brush system according to claim 1, wherein the second flexible region includes a plurality of region portions, the first flexible region being disposed between the region portions of the second flexible region, at a cross-section and along the entire circumference of the brush.

7. The rotatable livestock brush system according to claim 1, wherein the second flexible region extends substantially at an angle of less than 90 degrees relative to the central rotation axis of the brush.

8. The rotatable livestock brush system according to claim 7, wherein the second flexible region extends substantially at an angle of between 25 and 65 degrees relative to the central rotation axis of the brush.

9. The rotatable livestock brush system according to claim 1, wherein,
the first flexible region comprises at least one resilient element having a first resistance to deformation,
the second flexible region comprises at least one resilient element having a second resistance to deformation, and
the first resistance differs from the second resistance.

10. The rotatable livestock brush system according to claim 9, wherein,
the first flexible region is formed by free ends of first elongate and resilient brush elements,
the second region is formed by free ends of second elongate and resilient brush elements, and
the second brush elements have a stiffness which differs from a stiffness of the first brush elements.

11. The rotatable livestock brush system according to claim 1, wherein the second flexible region adjacently contacts the first flexible region.

12. The rotatable livestock brush according to claim 1, the second flexible region is provided between the helical first flexible region.

13. A rotatable livestock brush, comprising:
a central rotation axis; and
a cylindrical brush body having a brush surface including a first flexible region and a second flexible region, the first flexible region and the second flexible region having different first and second pressure transfer properties,
wherein the brush is sized to massage a body of a livestock animal that comes into contact with the brush,
the brush is attachable to a motorized rotation device and rotatable about the central rotation axis by operation of the motorized rotation device to cause the first flexible region and the second flexible region of the brush to respectively alternately transfer varying pressures, corresponding to the first and second pressure transfer properties, onto the body of the livestock animal by alternately bringing the first flexible region and the second flexible region into contact with the body of the livestock animal to massage the livestock animal with both the first flexible region and the second flexible region,
wherein each of the first flexible region and the second flexible region comprises a plurality of adjacent flexible bristles, and
wherein the second flexible region is helical and extends around an entire circumference of the brush.

14. The rotatable livestock brush according to claim 13, wherein the first flexible region and the second flexible region are at a same distance from the central rotation axis.

15. A rotatable cow brush system, comprising:
a support device fitted to a surface of a cow housing structure or a support structure within a cow area;
a motor; and
a rotatable cylindrical cow brush suspended from the support device and connected to the motor,
the brush comprising a central rotation axis and a brush surface including a first flexible region and a second flexible region, the first flexible region and the second flexible region having different first and second pressure transfer properties,
the brush being sized to massage a body of a cow that comes into contact with the brush,
the brush being rotatable about the central rotation axis by operation of the motor to cause the first flexible region and the second flexible region of the brush to respectively alternately transfer varying pressures, corresponding to the first and second pressure transfer properties, onto the body of the cow by alternately bringing the first flexible region and the second flexible region into contact with the body of the cow to massage the cow with both the first flexible region and the second flexible region,
wherein each of the first flexible region and the second flexible region comprises a plurality of adjacent flexible and deformable bristles, and
the second flexible region is helical and extends around an entire circumference of the brush.

* * * * *